United States Patent
Yukikata et al.

(10) Patent No.: US 11,833,621 B2
(45) Date of Patent: Dec. 5, 2023

(54) FLUX AND SOLDER MATERIAL

(71) Applicant: KOKI COMPANY LIMITED, Tokyo (JP)

(72) Inventors: Kazuhiro Yukikata, Tokyo (JP); Noriyoshi Uchida, Tokyo (JP)

(73) Assignee: KOKI COMPANY LIMITED, Tokyo (JP)

( * ) Notice: Subject to any disclaimer, the term of this patent is extended or adjusted under 35 U.S.C. 154(b) by 0 days.

(21) Appl. No.: 17/052,318

(22) PCT Filed: Apr. 27, 2019

(86) PCT No.: PCT/JP2019/018170
§ 371 (c)(1),
(2) Date: Nov. 2, 2020

(87) PCT Pub. No.: WO2019/216291
PCT Pub. Date: Nov. 14, 2019

(65) Prior Publication Data
US 2021/0086317 A1 Mar. 25, 2021
US 2023/0103270 A2 Mar. 30, 2023

(30) Foreign Application Priority Data
May 8, 2018 (JP) .................. 2018-090218

(51) Int. Cl.
*B23K 35/362* (2006.01)
*B23K 35/36* (2006.01)
*B23K 35/26* (2006.01)
*C22C 13/00* (2006.01)
*B22F 1/10* (2022.01)

(52) U.S. Cl.
CPC ............ *B23K 35/3616* (2013.01); *B22F 1/10* (2022.01); *B23K 35/262* (2013.01); *B23K 35/362* (2013.01); *B23K 35/3612* (2013.01); *C22C 13/00* (2013.01)

(58) Field of Classification Search
CPC .......................... B23K 35/3612; B23K 35/362
See application file for complete search history.

(56) References Cited

U.S. PATENT DOCUMENTS

| | | | | |
|---|---|---|---|---|
| 4,831,063 A | * | 5/1989 | Suzuki | C08G 65/2681 522/18 |
| 6,509,406 B1 | | 1/2003 | Brenner et al. | |
| 2010/0217027 A1 | | 8/2010 | Tanaka | |
| 2012/0245196 A1 | * | 9/2012 | Stevens | A61P 25/16 546/112 |
| 2015/0217409 A1 | * | 8/2015 | Akagawa | H01B 1/02 174/126.2 |
| 2018/0015576 A1 | * | 1/2018 | Yukikata | C07C 43/17 |

FOREIGN PATENT DOCUMENTS

| | | |
|---|---|---|
| CN | 1330679 A | 1/2002 |
| CN | 101808971 A | 8/2010 |
| CN | 101945672 A | 1/2011 |
| CN | 101970381 A | 2/2011 |
| CN | 104816104 A | 8/2015 |
| CN | 107075317 A | 8/2017 |
| EP | 2905349 A2 | 8/2015 |
| EP | 3216837 A1 | 9/2017 |
| JP | 0211295 A | 1/1990 |
| JP | 2000135592 A | 5/2000 |
| JP | 2002120089 A | 4/2002 |
| JP | 2014188578 A | 10/2014 |
| WO | 2009081169 A2 | 7/2009 |
| WO | 2009103666 A2 | 8/2009 |
| WO | 2016125901 A1 | 8/2016 |

OTHER PUBLICATIONS

International Search Report (Form PCT/ISA/210) for International Patent Application No. PCT/JP2019/018170, issued from the Japan Patent Office, dated Jul. 23, 2019, with English-language translation, 3 pages.

Written Opinion of the International Searching Authority (Form PCT/ISA/237) for International Patent Application No. PCT/JP2019/018170, issued from the Japan Patent Office, dated Jul. 23, 2019, 3 pages.

Decision to Grant for Japanese Patent Application No. JP 2019-544075, issued from the Japan Patent Office, dated Sep. 9, 2019, with English-language translation, 6 pages.

* cited by examiner

*Primary Examiner* — Jophy S. Koshy
(74) *Attorney, Agent, or Firm* — Kilyk & Bowersox, P.L.L.C.

(57) ABSTRACT

An iodine-containing cyclic compound including no carboxy group and including one ring skeleton or a plurality of ring skeletons forming a fused ring in one molecule, is provided. The ring of the ring skeleton includes only a carbon atom, or a carbon atom, and a nitrogen atom and/or an oxygen atom, and an iodine atom is bonded to at least one of the atoms constituting the ring of the ring skeleton.

14 Claims, 7 Drawing Sheets

| EXAMPLES | IODINE-CONTAINING CYCLIC COMPOUNDS | STRUCTURAL FORMULAS |
|---|---|---|
| 1 | iodocyclohexane | |
| 2 | 1-tert-butoxycarbonyl-4-iodopiperidine | |
| 3 | 4-iodophenol | |
| 4 | 2,4,6-triiodophenol | |
| 5 | ethyl 3-iodobenzoate | |
| 6 | ethyl 3-iodobenzoate | |
| 7 | 4'-iodoacetophenone | |

Fig. 1

| EXAMPLES | IODINE-CONTAINING CYCLIC COMPOUNDS | STRUCTURAL FORMULAS |
|---|---|---|
| 8 | methyl 5-iodoanthranilate | |
| 9 | iohexol (mixture of isomers) | |
| 10 | 2-bromo-4-chloro-1-iodobenzene | |
| 11 | 1-iodonaphthalene | |
| 12 | 2-bromo-5-iodo-3-methylpyridine | |
| 13-18 | 5,7-diiodo-8-hydroxyquinoline | |
| 19 | 2,4,5-triiodo-1h-imidazole | |
| 20 | 1,3-diiodo-5,5-dimethylhydantoin | |

Fig. 2

| COMPARATIVE EXAMPLES | BROMINE-BASED COMPOUNDS | STRUCTURAL FORMULAS |
|---|---|---|
| 2 | DBBD<br>trans-2,3-dibromo-2-butene-1,4-diol | |
| 3 | TAIC6B<br>tris(2,3-dibromopropyl) isocyanurate | |
| 4 | 4-bromophenol | |
| 5 | 2,4,6-tribromophenol | |
| 6 | 3,5-dibromo-8-hydroxyquinoline | |

Fig. 3

Fig. 6 – Table 1

| Formulation quantity (wt%) | | | | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|---|---|
| resin (resin based) | KE-604 | | | 51.8 | 51.8 | 51.8 | 51.8 | 51.8 | 51.8 | 51.8 | 51.8 | 51.8 | 51.8 | 51.8 | 51.8 | 51.0 | 51.4 | 51.8 | 52.1 | 52.2 | 52.3 | 51.8 | 51.8 |
| thixotropic agent | SLIPACKS ZHH | | | 5.18 | 5.18 | 5.18 | 5.18 | 5.18 | 5.18 | 5.18 | 5.18 | 5.18 | 5.18 | 5.18 | 5.18 | 5.10 | 5.14 | 5.18 | 5.21 | 5.22 | 5.23 | 5.18 | 5.18 |
| solvent | HeDG | | | 41.5 | 41.5 | 41.5 | 41.5 | 41.5 | 41.5 | 41.5 | 41.5 | 41.5 | 41.5 | 41.5 | 41.5 | 40.8 | 41.1 | 41.5 | 41.7 | 41.8 | 41.8 | 41.5 | 41.5 |
| activator (organic acid-based) | Adipic Acid | | | 0.52 | 0.52 | 0.52 | 0.52 | 0.52 | 0.52 | 0.52 | 0.52 | 0.52 | 0.52 | 0.52 | 0.52 | 0.51 | 0.51 | 0.52 | 0.52 | 0.52 | 0.52 | 0.52 | 0.52 |
| Iodine containing cyclic compound | | 1 | iodocyclohexane | 1.04 | | | | | | | | | | | | | | | | | | | |
| | | 2 | 1-tert-butoxycarbonyl-4-iodopiperidine | | 1.04 | | | | | | | | | | | | | | | | | | |
| | | 3 | 4-iodophenol | | | 1.04 | | | | | | | | | | | | | | | | | |
| | | 4 | 2,4,6-triiodophenol | | | | 1.04 | | | | | | | | | | | | | | | | |
| | | 5 | ethyl 3-iodobenzoate | | | | | 1.04 | | | | | | | | | | | | | | | |
| | | 6 | 4-iodobenzaldehyde | | | | | | 1.04 | | | | | | | | | | | | | | |
| | | 7 | 4'-iodoacetophenone | | | | | | | 1.04 | | | | | | | | | | | | | |
| | | 8 | methyl 5-iodoanthranilate | | | | | | | | 1.04 | | | | | | | | | | | | |
| | | 9 | iohexol (mixture of isomers) | | | | | | | | | 1.04 | | | | | | | | | | | |
| | | 10 | 2-bromo-4-chloro-1-iodobenzene | | | | | | | | | | 1.04 | | | | | | | | | | |
| | | 11 | 1-iodonaphthalene | | | | | | | | | | | 1.04 | | | | | | | | | |
| | | 12 | 2-bromo-5-iodo-3-methylpyridine | | | | | | | | | | | | 1.04 | | | | | | | | |
| | | 13 | 5,7-diiodo-8-hydroxyquinoline | | | | | | | | | | | | | 2.55 | | | | | | | |
| | | 14 | 2,4,5-triiodo-1h-imidazole | | | | | | | | | | | | | | 1.80 | | | | | 1.04 | |
| | | 15 | 1,3-diiodo-5,5-dimethylhydantoin | | | | | | | | | | | | | | | 1.04 | 0.52 | 0.26 | 0.13 | | 1.04 |
| total | | | | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| (%) rate of void | | | | 4.6 | 12.5 | 10.9 | 11.2 | 13.6 | 4.5 | 14.6 | 12.1 | 13.4 | 9.2 | 11.5 | 12.4 | 4.4 | 6.2 | 3.9 | 3.9 | 12.6 | 14.7 | 9.1 | 4.5 |

Examples

| Formulation quantity (wt%) | | Comparative examples | | | | | |
|---|---|---|---|---|---|---|---|
| | | 1 | 2 | 3 | 4 | 5 | 6 |
| resin(rosin based) | KE-604 | 51.8 | 51.8 | 51.8 | 51.8 | 51.8 | 51.8 |
| thixotropic agent | SLIPACKS ZHH | 5.18 | 5.18 | 5.18 | 5.18 | 5.18 | 5.18 |
| solvent | HeDG | 41.5 | 41.5 | 41.5 | 41.5 | 41.5 | 41.5 |
| activator (organic acid-based) | Adipic Acid | 1.55 | 0.52 | 0.52 | 0.52 | 0.52 | 0.52 |
| bromine-based compounds | trans-2,3-dibromo-2-butene-1,4-diol | | 1.04 | | | | |
| | tris(2,3-dibromopropyl) isocyanurate | | | 1.04 | | | |
| | 4-bromophenol | | | | 1.04 | | |
| | 2,4,6-tribromophenol | | | | | 1.04 | |
| | 3,5-dibromo-8-hydroxyquinoline | | | | | | 1.04 |
| total | | 100 | 100 | 100 | 100 | 100 | 100 |
| (%) rate of void | | 38.6 | 20.2 | 32.2 | 21.7 | 20.6 | 19.7 |

Fig. 7 – Table 2

FLUX AND SOLDER MATERIAL

FIELD OF THE INVENTION

The present invention relates to a flux and a solder material containing the flux.

BACKGROUND TO THE INVENTION

Solder used for joining electronic parts, for example, is composed of a solder material containing a solder alloy and flux. The flux is formulated to improve solderability and contains multiple components such as resin, activator, solvent, antioxidant, and thixotropic agent components. Among the solderability, in order to improve solder wettability and solder meltability, halogen-based compounds have been conventionally used.

For example, Patent Document 1 describes a flux containing, as an activator, a halogen compound in which a halogen atom such as bromine and chlorine atoms is introduced into an organic compound by a covalent bond.

Patent Document 2 describes a flux containing an iodine-based carboxyl compound as an activator.

Patent Document 3 describes a flux containing a halogen compound activator in which a halogen atom such as iodine and bromine atoms bonded to a linear chain at a specific position of an aliphatic compound.

On the other hand, each of the above-mentioned components also contains a compound that generates gas during heating, and voids may be generated by the gas. Although such voids cause a decrease in heat dissipation of an electrical connection, the generation of voids cannot be sufficiently suppressed by the conventional flux as described above.

DOCUMENTS FOR PRIOR ART

Patent Document 1: Japanese Patent Application Publication No. 2002-120089
Patent Document 2: Japanese Patent Application Publication No. 2014-188578
Patent Document 3: Japanese Patent Application Publication No. 2016-140915

SUMMARY OF THE INVENTION

Problem to be Solved by the Invention

The present invention has been made in view of the above-mentioned problem of the prior arts, and an object of the present invention is to provide a flux and a solder material capable of sufficiently suppressing the generation of voids.

Means for Solving the Problems

A flux of the present invention contains an iodine-containing cyclic compound including no carboxy group and including one ring skeleton or a plurality of ring skeletons forming a fused ring in one molecule, in which the ring of the ring skeleton includes only a carbon atom, or a carbon atom, and a nitrogen atom and/or an oxygen atom, and an iodine atom is bonded to at least one of the atoms constituting the ring of the ring skeleton.

The ring skeleton may be a 5-membered ring or a 6-membered ring.

The ring of the ring skeleton may include a carbon atom, and a nitrogen atom or an oxygen atom.

The ring skeleton may be one selected from the group consisting of cyclohexane, benzene, pyridine, imidazole, hydantoin, furan, naphthalene, and quinoline skeletons.

The iodine-containing cyclic compound may be contained in an amount of 0.1% by mass or more and 5.0% by mass or less.

The flux may contain an activator in an amount of 0.5% by mass or more and 20% by mass or less.

The present invention relating to a solder material includes the flux and a solder alloy.

Effects of Invention

According to the present invention, a flux and a solder material capable of sufficiently suppressing the generation of voids can be provided

BRIEF DESCRIPTION OF THE DRAWINGS

FIG. 1 illustrates structures of iodine-containing cyclic compounds used in Examples.
FIG. 2 illustrates structures of iodine-containing cyclic compounds used in Examples.
FIG. 3 illustrates structures of bromine-based compounds used in Comparative Examples.
FIG. 6 shows Table 1.
FIG. 7 shows Table 2.

DETAILED DESCRIPTION OF THE INVENTION

Figure 4:
FIG. 4 shows photographs of test substrates of Examples.

A flux and a solder material containing the flux according to the present invention will be described below.

The flux of the present embodiment contains an iodine-containing cyclic compound including no carboxy group and including one ring skeleton or a plurality of ring skeletons forming a fused ring in one molecule, in which the ring of the ring skeleton includes only a carbon atom, or a carbon atom, and a nitrogen atom and/or an oxygen atom, and an iodine atom is bonded to at least one of the atoms constituting the ring of the ring skeleton.

In the present embodiment, the ring skeleton refers to a portion of cyclic arrangement of atoms included in a molecule.

The ring skeleton may be a structure in which a ring is composed of only carbon atoms (a homocyclic ring), or a structure in which a ring is composed of a carbon atom and an atom other than a carbon atom (a heterocyclic ring).

When the ring skeleton is a heterocyclic ring, examples of the heteroatom constituting the ring include nitrogen and oxygen atoms. Hereinafter, each atom is also simply referred to as carbon, nitrogen, or oxygen, etc.

The ring may include one or more nitrogens or oxygens as heteroatoms constituting the ring. In addition, nitrogen and oxygen may be included as a different heteroatom.

Examples of the ring skeleton include a ring skeleton having no double bond such as cycloalkane and cyclopentane skeletons, a ring skeleton having a double bond such as cyclohexene, cyclopentene, and benzene skeletons, and a ring skeleton having one or more of the above-mentioned heteroatoms as atoms constituting the ring of the ring skeleton, such as pyridine, imidazole, hydantoin, furan, and pyrrole skeletons.

The ring skeleton, which is the above-mentioned skeleton in the present embodiment, refers to a skeleton in which an iodine is bonded to at least one of the atoms constituting a ring of a basic ring skeleton such as cyclohexane and benzene skeletons. The ring skeleton also includes a skeleton in which halogen atoms other than an iodine, and/or other substituents are bonded to the basic ring skeleton.

The iodine-containing cyclic compound of the present embodiment may have a plurality of ring skeletons forming a fused ring.

Examples of the plurality of ring skeletons forming a fused ring include, but are not particularly limited to, a fused ring of a 6-membered ring and a 5-membered ring, and a fused ring of a 6-membered ring and a 6-membered ring. In addition, each ring skeleton constituting the fused ring may be a heterocyclic ring or a homocyclic ring as mentioned above. Further, the fused ring may have various substituents.

Examples of the fused ring include ring skeletons consisting of fused rings such as pentalene, indene, naphthalene, quinoline, indole, and benzimidazole skeletons.

The ring skeleton preferably includes one selected from the group consisting of cyclohexane, benzene, pyridine, imidazole, hydantoin, furan, naphthalene, and quinoline skeletons.

The ring skeleton has an iodine that is bonded to at least one of the atoms constituting the ring.

The ring skeleton may have one or more iodines that are bonded to the elements constituting the ring skeleton. In addition, a halogen atom other than an iodine, such as a bromine and chlorine, may be bonded together with one or more iodines.

Further, the ring skeleton may or may not have a substituent other than an iodine.

Examples of the substituent other than an iodine include halogen atoms other than an iodine such as a bromine and chlorine, a hydrogen atom, an oxygen atom, hydroxy groups, acyl groups such as formyl and acetyl groups, amino groups, amide groups, esters, an acetamide group, alkoxy groups such as methoxy and ethoxy groups, aryl groups, sulfone groups, a benzyl group, alkyl groups such as alkane, alkene, and alkyne groups, and these substituents having a substituent.

Examples of the iodine-containing compound of the present embodiment include iodine-containing cyclic compounds represented by the following Formula 1 or general formulas, Formulas 2 to 12. In the general formulas, X1 and X2 are the same or different halogen atoms, $R_1$, $R_2$, and $R_3$ are each a hydrogen atom, a hydroxy group (—OH), —C(=O)—H, or a group represented by —C(=O)—$R_4$ ($R_4$ is an alkyl group), —C(=O)—NH—$R_5$, or —N$R_6$—C(=O)—$R_7$ ($R_{5-7}$ are alkyl groups having a hydroxy group as a substituent), and $R_1$, $R_2$, and $R_3$ may be the same or different groups.

[Formula 1]

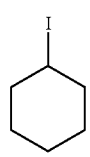

[Formula 2]

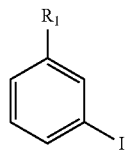

[Formula 3]

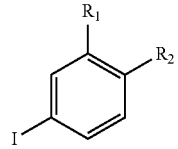

[Formula 4]

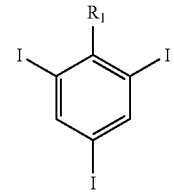

[Formula 5]

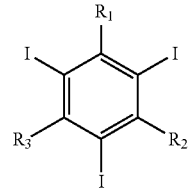

[Formula 6]

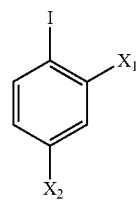

[Formula 7]

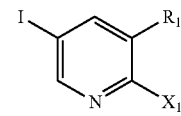

[Formula 8]

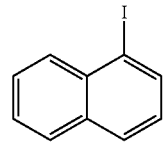

[Formula 9]

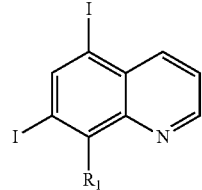

[Formula 10]

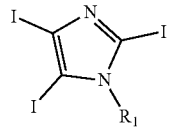

[Formula 11]

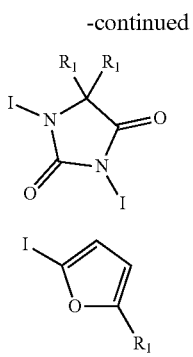

[Formula 12]

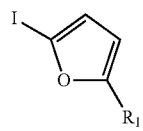

Specific examples of the iodine-containing cyclic compound include the following.

Examples of the iodine-containing cyclic compound having a cyclohexane skeleton as the ring skeleton include iodocyclohexane and 1-tert-butoxycarbonyl-4-iodopiperidine.

Examples of the iodine-containing cyclic compound having a benzene skeleton as the ring skeleton include 4-iodophenol, 2,4,6-triiodophenol, ethyl 3-iodobenzoate, 4-iodobenzaldehyde, 4'-iodoacetophenone, methyl 5-iodoanthranilate, iohexol, 2-bromo-4-chloro-1-iodobenzene.

Examples of the iodine-containing cyclic compound having a pyridine skeleton as the ring skeleton include 2-bromo-5-iodo-3-methylpyridine.

Examples of the iodine-containing cyclic compound having an imidazole skeleton as the ring skeleton include 2,4,5-triiodo-1 h-imidazole.

Examples of the iodine-containing cyclic compound having a hydantoin skeleton as the ring skeleton include 1,3-diiodo-5,5-dimethylhydantoin.

Examples of the iodine-containing cyclic compound having a furan skeleton as the ring skeleton include 5-iodo-2-furaldehyde.

Examples of the iodine-containing cyclic compound having a naphthalene skeleton as the ring skeleton include 1-iodonaphthalene.

Examples of the iodine-containing cyclic compound having a quinoline skeleton as the ring skeleton include 5,7-diiodo-8-hydroxyquinoline.

The content of the iodine-containing cyclic compound in the flux is not particularly limited, but include, for example, 0.1% by mass or more and 5.0% by mass or less, preferably 0.5% by mass or more and 2.6% by mass or less.

When the content of the iodine-containing cyclic compound in the flux is within the above range, the flux can effectively suppress the generation of voids.

The content of the iodine-containing cyclic compound in the present embodiment can be measured by a known method using gas chromatography-mass spectrometry (GC/MS) and combustion-ion chromatography.

In addition to the iodine-containing cyclic compound, the flux of the present embodiment may include known flux components such as various activator components, activator components other than isocyanuric acid derivatives, and resin, solvent, antioxidant, and thixotropic components.

These components can be formulated to the flux as needed, and any of the components may or may not be contained.

The flux of the present embodiment may further contain an organic acid as an activator component other than the iodine-containing cyclic compound.

The organic acid is not particularly limited as long as it is a known component used as an activator component of flux. Examples of such organic acid include glutaric acid, succinic acid, methylsuccinic acid, azelaic acid, adipic acid, sebacic acid, stearic acid, benzoic acid, dodecanedioic acid, maleic acid, and cyanulic acid.

The organic acid can be used alone or in combination of two or more.

The content of the activator such as the organic acid in the flux is not particularly limited, but include, for example, 0.5% by mass or more and 20% by mass or less, preferably 3.0% by mass or more and 10% by mass or less in terms of the solid content (the ratio in the components other than the solvent component).

Other than the organic acid, activator components such as amine halogen salts and halogen compounds can be used.

In this case, the concentration of the entire halogen in the flux including the halogen in the iodine-containing cyclic compound is preferably 1.0% by mass or less, preferably 0.5% by mass or less.

Since an activator component contains a large amount of components that generate gas during heating, such as organic acids, it is conceivable to reduce the content of an activator component to suppress voids, but if an activator component is reduced, the solderability is disadvantageously lowered.

Since the flux of the present embodiment contains an iodine-containing cyclic compound, the generation of voids can be suppressed without reducing an activator component. Therefore, generation of voids can be suppressed while maintaining the solderability.

The flux of the present embodiment may contain a resin component as a rosin component.

The resin component is not particularly limited as long as it is a known resin component used as a resin component of flux, such as a synthetic resin and a natural resin. Examples of the resin component include polymerized rosin, hydrogenated rosin, natural rosin, disproportionated rosin, and acid-modified rosin.

The resin can be used alone or in combination of two or more.

In this case, the content of the resin component in the flux is not particularly limited, but includes, for example, 50% by mass or more and 90% by mass or less, preferably 70% by mass or more and 80% by mass or less in terms of the solid content.

The solvent component is not particularly limited as long as it is a known component used as a solvent component of flux. Examples of the solvent component include, glycol ethers such as diethylene glycol monohexyl ether (hexyl diglycol), diethylene glycol dibutyl ether (dibutyl diglycol), diethylene glycol mono 2-ethylhexyl ether (2 ethyl hexyl diglycol), and diethylene glycol monobutyl ether (butyl diglycol); aliphatic compounds such as n-hexane, isohexane, and n-heptane; esters such as isopropyl acetate, methyl propionate and ethyl propionate; ketones such as methyl ethyl ketone, methyl-n-propyl ketone and diethyl ketone; and alcohols such as ethanol, n-propanol, isopropanol, isobutanol and octanediol.

Although voids can be suppressed by employing a highly volatile component as a solvent component, in this case, the time during which the tackiness of a solder material can be maintained is disadvantageously shortened.

Since the flux of the present embodiment contains the iodine-containing cyclic compound, the generation of voids can be suppressed without selecting the type of solvent.

The solvent can be used alone or in combination of two or more.

The content of the solvent component in the flux is not particularly limited, but includes, for example, 20% by mass or more and 70% by mass or less, preferably 30% by mass or more and 60% by mass or less.

The thixotropic component is not particularly limited as long as it is a known component used as a thixotropic component of flux. Examples of the thixotropic component include hydrogenated castor oil, fatty acid amides, oxyfatty acids, and waxes.

The content of the thixotropic component in the flux is not particularly limited, but includes, for example, 3.0% by mass or more and 20% by mass or less, preferably 5.0% by mass or more and 10% by mass or less.

The flux of the present embodiment may further contain other additives.

The flux of the present embodiment can be used as a flux for a solder paste but can be also used as a liquid flux such as a post flux and a flux for a solder material such as resin flux cored solder.

The solder material of the present embodiment contains above-mentioned fluxes and a solder alloy.

The solder alloy may be a lead-free alloy.

The solder alloy is not particularly limited and may be either a lead-free solder alloy or a leaded solder alloy, but a lead-free solder alloy is preferable from the viewpoint of environmental impact.

Specific examples of a lead-free solder alloy include alloys containing tin, silver, copper, zinc, bismuth, and antimony, and more specifically, alloys such as Sn/Ag, Sn/Ag/Cu, Sn/Cu, Sn/Ag/Bi, Sn/Bi, Sn/Ag/Cu/Bi, Sn/Sb, Sn/Zn/Bi, Sn/Zn, Sn/Zn/Al, Sn/Ag/Bi/In, Sn/Ag/Cu/Bi/In/Sb, and In/Ag. In particular, Sn/Ag/Cu is preferable.

The content of the solder alloy in the solder material is not particularly limited, but includes, for example, 80% by mass or more and 95% by mass or less, preferably 85% by mass or more and 90% by mass or less.

When the solder material of the present embodiment is a solder paste obtained by mixing the solder alloy and the flux of the present embodiment, it is preferable that, for example, the solder alloy is contained in an amount of 80% by mass or more and 95% by mass or less, and the flux is contained in an amount of 5% by mass or more and 20% by mass or less.

For using the solder material of the present embodiment, conditions can be appropriately set according to an object to be soldered. The conditions are not particularly limited, but include, for example, the temperature rise rate during preheating: 1.0 to 3.0° C./sec, preheat temperature: 150 to 190° C./60 to 100 sec, heating rate during solder melting: 1.0 to 2.0° C./sec, melting temperature: 219° C. or higher for 30 seconds or longer, and reflow peak temperature: 230 to 250° C.

When the flux of the present embodiment is formulated to a solder material, it can suppress the generation of voids without suppressing the use of the active component. Therefore, the generation of voids can be suppressed without lowering the wettability.

Since the solder material of the present embodiment employs the above-mentioned flux, the solderability is good while the generation of voids can be suppressed.

The solder material of the present embodiment may contain a solder alloy without limitation as long as it is a common solder alloy, but a lead-free solder alloy is particularly suitable.

A lead-free solder material containing a lead-free solder alloy has a problem that gas generated by a component such as a volatile component of flux tends to remain during solder melting, and thereby voids are likely to occur. The flux of the present embodiment can suppress voids even when used in such a lead-free solder material.

The solder material of the present embodiment is suitable for mounting electronic parts on a substrate, particularly for mounting electronic parts such as quad flat no-leads (QFNs) and power transistors, which have a relatively large solder joint area and a small space for gas to escape during heating. Although voids are likely to be generated due to the generation of gas in mounting of these parts, the generation of voids can be suppressed more effectively by using the solder material of the present embodiment.

The flux and the solder material according to the present embodiment are as described above, but it should be considered that the embodiment disclosed herein is exemplary in all respects and is not restrictive. The scope of the present invention is shown not by the above description but by the scope of claims, and it is intended that all modifications within the meaning and scope equivalent to the scope of claims are included.

EXAMPLES

Next, Examples of the present invention will be described together with Comparative Examples. It should be noted that the present invention is not construed as being limited to the following Examples.

Preparation of Flux

The materials shown below and the iodine-containing cyclic compounds shown in Tables 1 and 2 (see FIGS. 1 to 3 for structural formulas) were used in the formulations shown in Tables 1 and 2 to prepare fluxes to be used in Examples and Comparative Examples.

The materials for each of Examples and Comparative Examples were respectively placed into an appropriate container and mixed at room temperature until all the materials were uniformly dissolved to obtain a flux.

Material and Formulation

Rosin Component

Acid-modified ultra-light-colored rosin: KE-604, made by Arakawa Chemical Industries, Ltd.

Solvent Component

Hexyl diglycol (HeDG): made by Nippon Nyukazai Co., Ltd.

Thixotropic Agent

Hexamethylenebis behenamide: Slipax ZHH, made by Mitsubishi Chemical Corporation Organic Acid Activator Component Adipic acid: made by Sumitomo Chemical Co., Ltd.

Solder Paste

Solder alloy powder (Sn—3.0% Ag—0.5% Cu, 20 to 38 μm particle size) and each flux are mixed at a ratio of 88±1% by mass and 12±1% by mass to prepare a pasty solder material (solder paste).

Test Substrate

Using the solder material of each of the above-mentioned Examples and Comparative Examples, a test substrate was prepared as follows.

A substrate having a size of 100 mm×100 mm and a thickness of 1.6 mm was prepared for evaluation and subjected to heat treatment twice under the following temperature conditions.

Temperature Condition

In Preheating

Heating rate: 1.0 to 3.0° C./sec Preheat temperature: 150 to 190° C./60 to 100 seconds
In Solder Melting
Heating rate: 1.0 to 2.0° C./sec
Melting temperature: 219° C. or higher for 45 seconds
Peak temperature: 240° C.
Air Atmosphere A solder material was applied to the heat-treated substrate so as to have a thickness of 120 μm and a size of 6.0 mm×6.0 mm square. The application thickness was 120 μm. Then, a part (IC TXRX ETHERET 72QFP manufacturer: Microchip Technology) was mounted on the position to which the solder material was applied, and heated under the following conditions.

Temperature Condition
In Preheating
Heating rate: 1.0 to 3.0° C./sec
Preheat temperature: 150 to 190° C./60 to 100 seconds
In Solder Melting
Heating rate: 1.0 to 2.0° C./sec
Melting temperature: 219° C. or higher for 45 seconds
Peak temperature: 240° C.
Air Atmosphere
Void Evaluation In each test substrate prepared using the Examples and Comparative Examples, an X-ray transmission photograph was taken at the part mounting position. The photograph was binarized, the area of the joint and the void portion was measured, and the ratio of the area of the void portion to the joint was determined.

An imaging device was TUX-3100 made by Mars Token Co. Ltd., and the imaging conditions were tube voltage: 75.0V, tube current: 65.0 μA, filament current: 3.130 A, and magnification: 10.9×.

The results are shown in Tables 1 and 2, depicted in FIGS. 6 and 7, respectively.

Figure 5:
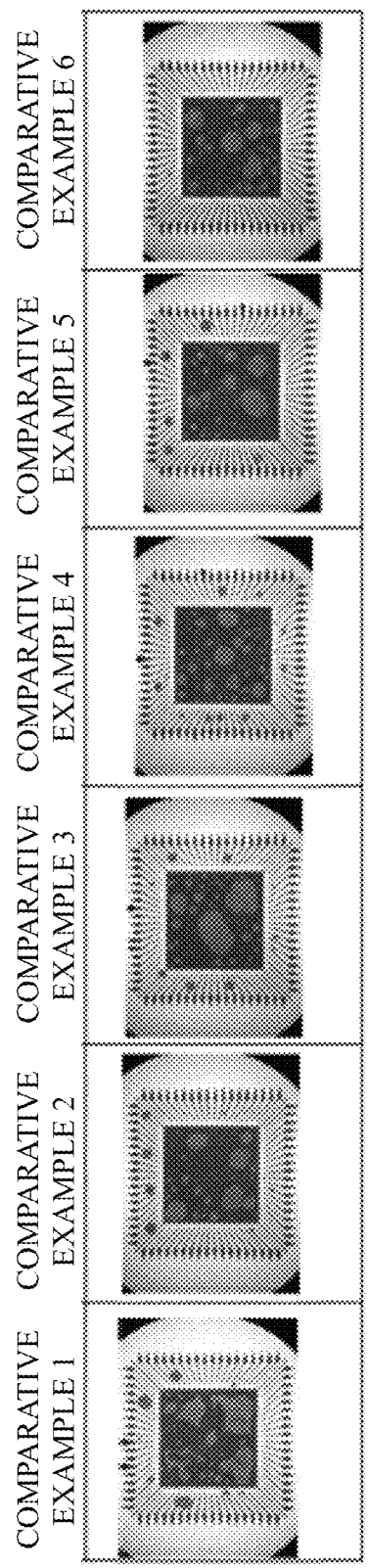
FIG. 5 shows photographs of test substrates of Comparative Examples.

In addition, photographs of the test substrates of Examples and Comparative Examples are shown in FIGS. 4 and 5.

As shown in Tables 1 and 2 and FIGS. 4 and 5, the generation of voids was extremely low in the test substrates of Examples as compared with Comparative Examples.

What is claimed is:

1. A flux for solder paste comprising:
an iodine-containing cyclic compound selected from the group consisting of 1-iodonaphthalene, 2-bromo-5-iodo-3-methylpyridine, 5,7-diiodo-8-hydroxyquinoline, 2,4,5-triiodo-1h-imidazole, and 1,3-diiodo-5,5-dimethylhydantoin, wherein
the flux contains the iodine-containing cyclic compound in an amount of from 0.1% by mass to 5.0% by mass.

2. The flux for solder paste according to claim 1, comprising an activator in an amount of 0.5% by mass or more and 20% by mass or less.

3. A solder paste comprising a mixture of the flux according to claim 1 and a solder alloy powder, wherein the flux is contained in an amount of 5% by mass or more and 20% by mass or less.

4. The flux for solder paste according to claim 1, wherein the flux contains the iodine-containing cyclic compound in an amount of from 0.5% by mass to 2.6% by mass.

5. The flux for solder paste according to claim 1, wherein the iodine-containing cyclic compound is 1-iodonaphthalene.

6. The flux for solder paste according to claim 1, wherein the iodine-containing cyclic compound is 2-bromo-5-iodo-3-methylpyridine.

7. The flux for solder paste according to claim 1, wherein the iodine-containing cyclic compound is 5,7-diiodo-8-hydroxyquinoline.

8. The flux for solder paste according to claim 1, wherein the iodine-containing cyclic compound is 2,4,5-triiodo-1h-imidazole.

9. The flux for solder paste according to claim 1, wherein the iodine-containing cyclic compound is 1,3-diiodo-5,5-dimethylhydantoin.

10. The solder paste according to claim 3, wherein the iodine-containing cyclic compound is 1-iodonaphthalene.

11. The solder paste according to claim 3, wherein the iodine-containing cyclic compound is 2-bromo-5-iodo-3-methylpyridine.

12. The solder paste according to claim 3, wherein the iodine-containing cyclic compound is 5,7-diiodo-8-hydroxyquinoline.

13. The solder paste according to claim 3, wherein the iodine-containing cyclic compound is 2,4,5-triiodo-1h-imidazole.

14. The solder paste according to claim 3, wherein the iodine-containing cyclic compound is 1,3-diiodo-5,5-dimethylhydantoin.

* * * * *